United States Patent
Zheng (10) Patent No.: US 11,429,248 B2
(45) Date of Patent: Aug. 30, 2022

(54) UNREAD MESSAGE PROMPT METHOD AND MOBILE TERMINAL

(71) Applicant: VIVO MOBILE COMMUNICATION CO., LTD., Dongguan (CN)

(72) Inventor: Kaitao Zheng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/376,160

(22) Filed: Jul. 15, 2021

(65) Prior Publication Data

US 2021/0342063 A1 Nov. 4, 2021

Related U.S. Application Data

(63) Continuation of application No. PCT/CN2020/071752, filed on Jan. 13, 2020.

(30) Foreign Application Priority Data

Jan. 15, 2019 (CN) .......................... 201910035917.8

(51) Int. Cl.
*G06F 3/04817* (2022.01)
*H04M 1/72469* (2021.01)
(Continued)

(52) U.S. Cl.
CPC ...... *G06F 3/04817* (2013.01); *G06F 3/04886* (2013.01); *G06F 21/32* (2013.01); *H04L 51/24* (2013.01); *H04L 51/26* (2013.01); *H04M 1/7243* (2021.01); *H04M 1/72469* (2021.01); *H04M 2201/42* (2013.01)

(58) Field of Classification Search
CPC .. G06F 3/04886; G06F 3/04817; G06F 21/32; H04L 51/24; H04L 51/26; H04M 1/7243; H04M 1/72469; H04M 2201/42; H04M 3/537; H04W 68/00; H04W 68/005
See application file for complete search history.

(56) References Cited

U.S. PATENT DOCUMENTS

2014/0074921 A1* 3/2014 Poornachandran ......................... G06F 16/9535
709/204
2014/0325371 A1 10/2014 Wilson et al.
(Continued)

FOREIGN PATENT DOCUMENTS

| CN | 105892974 A | 8/2016 |
| CN | 106598569 A | 4/2017 |

(Continued)

OTHER PUBLICATIONS

International Search Report issued in corresponding International Application No. PCT/CN2020/071752, dated Mar. 6, 2020, 4 pages.

*Primary Examiner* — Nicholas Ulrich
(74) *Attorney, Agent, or Firm* — IPX PLLC (57) ABSTRACT

Embodiments of the present disclosure provide an unread message prompt method and a mobile terminal. The method includes: if an unread message is received when the mobile terminal is in a screen-off state, identifying an application pushing the unread message; and highlighting an icon of the application on a screen of the mobile terminal, where a position where the icon is not displayed on the screen is in a screen-off state.

15 Claims, 6 Drawing Sheets

(51) Int. Cl.
  *G06F 3/04886*  (2022.01)
  *G06F 21/32*  (2013.01)
  *H04L 51/224*  (2022.01)
  *H04M 1/7243*  (2021.01)
  *H04L 51/226*  (2022.01)

(56) References Cited

U.S. PATENT DOCUMENTS

| | | | | |
|---|---|---|---|---|
| 2016/0062540 | A1* | 3/2016 | Yang | G06F 3/04883 345/173 |
| 2017/0212631 | A1* | 7/2017 | Kim | G06F 3/04883 |
| 2018/0075273 | A1* | 3/2018 | Vissa | G06K 9/22 |
| 2018/0335997 | A1* | 11/2018 | Li | G09G 3/2096 |
| 2019/0286321 | A1* | 9/2019 | Kim | G06F 3/045 |
| 2020/0092411 | A1* | 3/2020 | Xu | H04M 1/72436 |
| 2021/0109623 | A1* | 4/2021 | Bae | G06F 1/32 |

FOREIGN PATENT DOCUMENTS

| | | | |
|---|---|---|---|
| CN | 107278368 | A | 10/2017 |
| CN | 107329661 | A | 11/2017 |
| CN | 108021302 | A | 5/2018 |
| CN | 108038362 | A | 5/2018 |
| CN | 108337374 | A | 7/2018 |
| CN | 109739669 | A | 5/2019 |
| MX | 2017011610 | A | 10/2017 |

* cited by examiner

UNREAD MESSAGE PROMPT METHOD AND MOBILE TERMINAL

CROSS-REFERENCE TO RELATED APPLICATIONS

This application is a bypass continuation of PCT Application No. PCT/CN2020/071752 filed Jan. 13, 2020, which claims priority to Chinese Patent Application No. 201910035917.8 filed in China on Jan. 15, 2019, both of which are incorporated herein by reference in their entireties.

TECHNICAL FIELD

The present disclosure relates to the field of communications technologies, and in particular, to an unread message prompt method and a mobile terminal.

BACKGROUND

With continuous development of electronic information technologies, mobile terminals (such as smartphones, and tablet personal computers) are widely used and play an indispensable role in people's work and life. With increasing popularity of mobile terminals, a lot of important information is provided for users by using the mobile terminals, and the users need to process some important information in time.

In the related art, a mobile terminal is in a screen-off state after receiving an unread message, and a user cannot know whether the unread message is received by using the mobile terminal that is in a screen-off state. Therefore, the mobile terminal in the related art has a problem of poor unread message prompt effect.

SUMMARY

Embodiments of the present disclosure provide an unread message prompt method and a mobile terminal, to resolve a problem of poor unread message prompt effect of a mobile terminal in the related art.

To resolve the foregoing technical problem, the present disclosure is implemented as follows: an unread message prompt method, applied to a mobile terminal, where the method includes: if the mobile terminal that is in a screen-off state receives an unread message, identifying an application pushing the unread message; and highlighting an icon of the application on a screen of the mobile terminal, where a position where the icon is not displayed on the screen is in a screen-off state.

According to a first aspect, an embodiment of the present disclosure provides an unread message prompt method, applied to a mobile terminal, where the method includes: if the mobile terminal that is in a screen-off state receives an unread message, identifying an application pushing the unread message; and highlighting an icon of the application on a screen of the mobile terminal, where a position where the icon is not displayed on the screen is in a screen-off state.

According to a second aspect, an embodiment of the present disclosure further provides a mobile terminal, and the mobile terminal includes: a first recognition module, configured to: if the mobile terminal that is in a screen-off state receives an unread message, identify an application pushing the unread message; and a first display module, configured to highlight an icon of the application on a screen of the mobile terminal, where a position where the icon is not displayed on the screen is in a screen-off state.

According to a third aspect, an embodiment of the present disclosure further provides a mobile terminal, including: a processor, a memory, and a computer program that is stored in the memory and that can run on the processor, where when the computer program is executed by the processor, the steps of the foregoing unread message prompt methods are implemented.

According to a fourth aspect, an embodiment of the present disclosure further provides a computer-readable storage medium, where the computer-readable storage medium stores a computer program, and when the computer program is executed by a processor, the steps of the foregoing unread message prompt methods are implemented.

In the embodiments of the present disclosure, if the mobile terminal that is in a screen-off state receives an unread message, an application pushing the unread message is identified; and an icon of the application is highlighted on a screen of the mobile terminal, where a position where the icon is not displayed on the screen is in a screen-off state. In this way, after receiving an unread message in a screen-off state, the mobile terminal highlights the icon of the application on the screen to prompt a user to process the unread message in time, so as to improve an unread message prompt effect of the mobile terminal.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
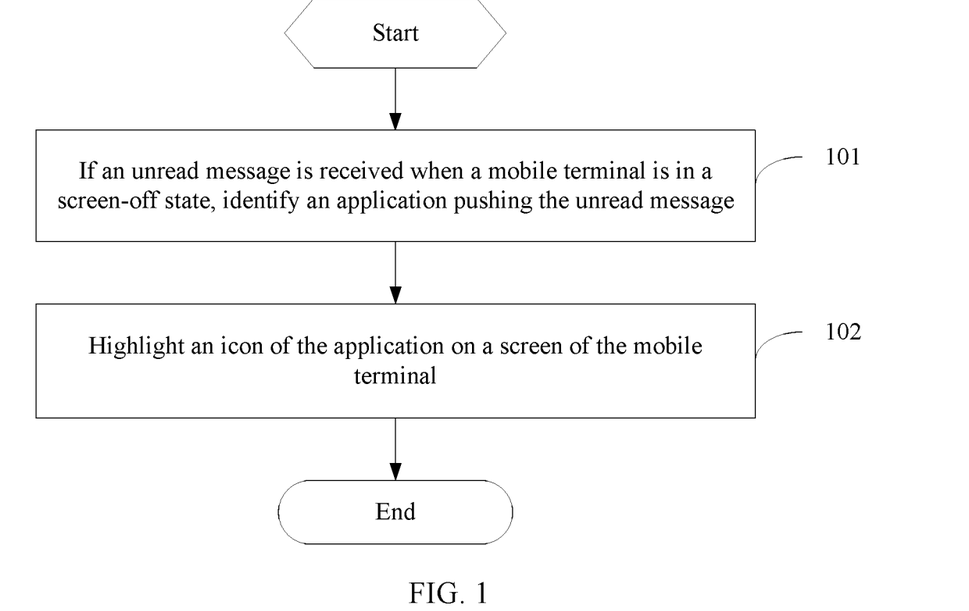
FIG. 1 is a flowchart of an unread message prompt method according to an embodiment of the present disclosure.

Referring to FIG. 1, FIG. 1 is a flowchart of an unread message prompt method according to an embodiment of the present disclosure. The method is applied to a mobile terminal, as shown in FIG. 1, and includes the following steps.

Step 101: If the mobile terminal that is in a screen-off state receives an unread message, identify an application pushing the unread message.

The screen-off state refers to a standby state in which a mobile terminal is in a screen-locked state and a backlight of the screen is turned off to save electric energy. An unread message sent by another mobile terminal or server can be received when the mobile terminal is in a screen-off state.

If an unread message sent by an application A on another mobile terminal is received when the mobile terminal is in a screen-off state, the mobile terminal can identify the application pushing the unread message, and can determine that the application pushing the unread message is the application A.

Step 102: Highlight an icon of the application on a screen of the mobile terminal, where a position where the icon is not displayed on the screen is in a screen-off state.

The icon that is highlighted on the screen can prompt a user to process the unread message in the application in a timely manner. Specifically, there are a variety of highlighting manners. The icon of the application may be displayed in a flashing manner, where the icon may be flashed at a fixed position or a plurality of positions; the icon of the application may be highlighted, that is, the icon of the application is displayed with a light higher than a preset brightness; or the icon of the application may be displayed movably, that is, the icon is continuously displayed on the screen, and a display position of the icon on the screen changes with time.

Figure 2A:
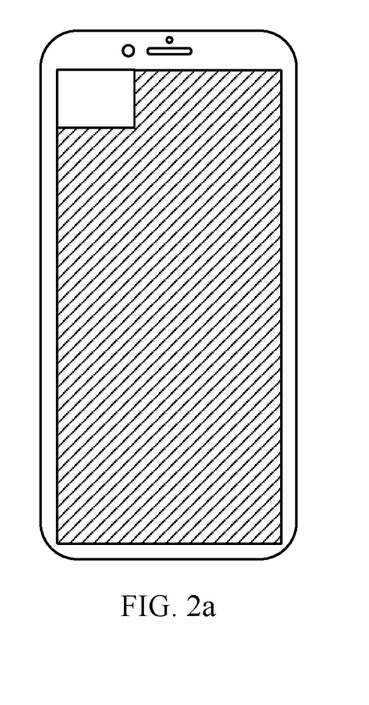
FIG. 2a is a schematic diagram of a state of a position where an icon is displayed and a position where an icon is not displayed at a highlighting time in an unread message prompt method according to an embodiment of the present disclosure.
Figure 2B:
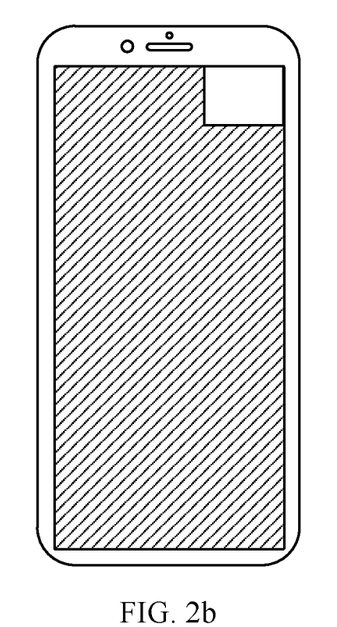
FIG. 2b is a schematic diagram of a state of a position where an icon is displayed and a position where an icon is not displayed at another highlighting time in an unread message prompt method according to an embodiment of the present disclosure.

On the screen, only an area where the icon is highlighted is lit, and other areas remain in a screen-off state. For example, in a case, the icon is highlighted at an upper left corner of the screen, and other areas except the upper left corner remain in a screen-off state (as shown in FIG. 2*a*, the blank area indicates a lighting state and the filling area indicates the screen-off state); and in another case, the icon is highlighted at an upper right corner of the screen, and other areas except the upper right corner remain in a screen-off state (as shown in FIG. 2*b*).

In addition, when there are a plurality of applications receiving an unread message, icons of the plurality of applications may be simultaneously highlighted on the screen. Taking highlighting as an example, if there are two applications receiving an unread message, icons of the two applications are simultaneously displayed at two positions on the screen, and an area on the screen other than the two icons is in a screen-off state.

In this embodiment of the present disclosure, the mobile terminal may be a mobile phone, a tablet personal computer, a laptop computer, a personal digital assistant (PDA), a mobile Internet device (MID), a wearable device, or the like.

In this embodiment of the present disclosure, if an unread message is received when the mobile terminal is in a screen-off state, an application pushing the unread message is identified; and an icon of the application is highlighted on a screen of the mobile terminal, where a position where the icon is not displayed on the screen is in a screen-off state. In this way, after receiving an unread message in a screen-off state, the mobile terminal highlights the icon of the application on the screen to prompt a user to process the unread message in time, so as to improve an unread message prompt effect of the mobile terminal.

Figure 3:
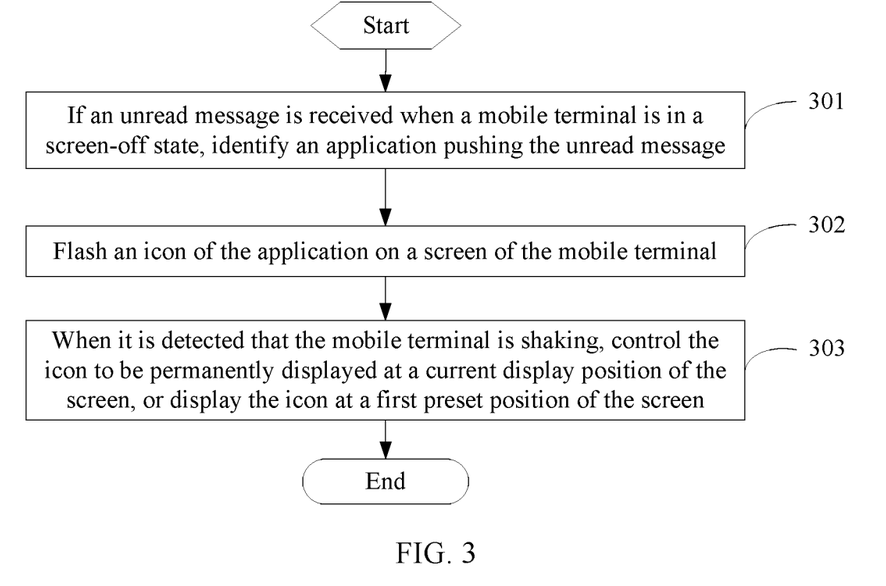
FIG. 3 is a flowchart of another unread message prompt method according to an embodiment of the present disclosure.

Referring to FIG. 3, FIG. 3 is a flowchart of another unread message prompt method according to an embodiment of the present disclosure. This embodiment mainly differs from the embodiment shown in FIG. 1 in that the highlighting display is a flashing display, and after step 102, an icon of an application is fixedly displayed at a position when it is detected that a mobile terminal is shaking. As shown in FIG. 3, the method includes the following steps.

Step 301: If the mobile terminal receives an unread message in a screen-off state, identify an application pushing the unread message.

For implementation processes and beneficial effects of step 301, correspondingly refer to the description in step 101. Details are not described herein again.

Step 302: Flash an icon of the application on a screen of the mobile terminal, where a position of the icon flashing on the screen changes with time, and a position where the icon is not displayed on the screen is in a screen-off state.

Flashing display has a better prompt effect and can better attract attention of users. A flashing frequency may be preset by the user or may be a default frequency. Similarly, brightness of the flashing display may be set by the user or may be the default display brightness.

Figure 4:
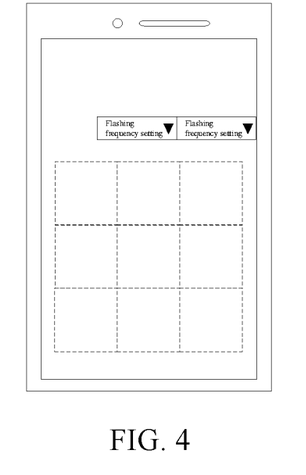
FIG. 4 is a schematic diagram of a plurality of flashing areas in an unread message prompt method according to an embodiment of the present disclosure.

A specific flashing manner of the icon may be flashing at a random position on the screen; may be flashing according to a preset trajectory; or may be that a plurality of flashing display areas (for example, the sudoku shown in FIG. 4) are preset on the screen, a time for switching a display area of the icon is set, and the icon flashes in one display area until the preset switching time is reached and then flashes in another display area, which is not limited herein. A flashing position of the icon changes with time, which can prevent the icon from flashing in one position for a long time and causing screen burn-in, so as to protect a display effect of the screen.

During each flashing display, only an area on the screen used to display the icon on the screen is lit, and other areas remain in a screen-off state. For example, in a case, the icon flashes at an upper left corner of the screen, and other areas except the upper left corner remain in a screen-off state (as shown in FIG. 2*a*, the blank area indicates a lighting state and the filling area indicates the screen-off state); and in another case, the icon flashes at an upper right corner of the screen, and other areas except the upper right corner remain in a screen-off state (as shown in FIG. 2*b*).

In addition, when there are a plurality of applications receiving an unread message, the icons of the plurality of applications may flash synchronously, that is, all icons are lit on at a same time or lit off at a same time; or the icons of a plurality of applications may flash sequentially. For example, the applications receiving an unread message include an application A, an application B, and an application C. During a first flashing, the icon of the application A is lit, and the icons of the applications B and C are not lit; during a second flashing, the icon of the application B is lit, and the icons of the applications A and C are not lit; and during a third flashing, the icon of the application C is lit, and the icons of the applications A and B are not lit. Flashing is performed cyclically according to this rule. Alternatively, the icons of various types of applications flash in sequence. For example, the applications receiving an unread message are application A, application B, and application C, where the applications A and C are for chat, and the application B is for shopping. During a first flashing, the icons of the applications A and C are lit, and the icon of the application B is not lit; and during a second flashing, the icon of the application B is lit, and the icons of the applications A and C are not lit. Flashing is performed cyclically according to this rule. Alternatively, a plurality of application icons flash in another manner. For example, based on a quantity of times a user uses application software, a flashing frequency of the icon of application software having a large quantity of usage times is high, a flashing frequency of the icon of application software having a small quantity of usage times is low, and the like, which is not limited in the present disclosure.

In an optional implementation, the step of flashing an icon of the application on a screen of the mobile terminal includes:

determining a quantity of unread messages received by the application.

The icon of the application flashes on the screen of the mobile terminal, where a display area of the icon is directly proportional to the quantity of the unread messages, or a flashing frequency of the icon is directly proportional to the quantity of the unread messages.

After step 301, the mobile terminal can count a quantity of unread messages received by each application. The more unread messages received by an application, the greater a probability that a user needs to process the unread messages in time. Increasing a display area of an icon during flashing or increasing a flashing frequency of an icon can improve a prompt effect of the application. Therefore, according to this implementation, a display area of an icon during flashing or a flashing frequency of an icon is increased to prompt that there is an application receiving a lot of unread messages.

For example, if the application A on the mobile terminal receives three unread messages, the application B receives two unread messages, and the application C receives five unread messages, a display area of the icon of the application C during flashing>a display area of the icon of the application A during flashing>a display area of the icon of the application B during flashing, or a flashing frequency of the icon of the application C during flashing>a flashing frequency of the icon of the application A during flashing>a flashing frequency of the icon of the application B during flashing.

In this implementation, a display area or flashing frequency of an application during flashing is directly proportional to a quantity of received unread messages, so that a significant prompt is achieved for an application having a large quantity of received unread messages, and a user is better prompted to process the unread messages in time.

It should be noted that a case described above in which the display area is directly proportional to the quantity of the unread messages can also be applied to the embodiment shown in FIG. 1. When the case is applied to the embodiment shown in FIG. 1, an area of the icon highlighted is directly proportional to the quantity of the unread messages, which can also achieve the same beneficial effect as above.

Step 303: When it is detected that the mobile terminal is shaking, control the icon to be fixedly displayed at a current display position of the screen, or display the icon at a first preset position of the screen.

That the mobile terminal shakes, that is, the mobile terminal shakes back and forth or swings up and down can be sensed by a gravity sensor inside the mobile terminal. When shaking of the mobile terminal is sensed, it is considered that a user picks up the stationary mobile terminal, so that the icon is fixedly displayed on the screen, which is convenient for the user to perform a touch operation on the icon to process a corresponding unread message.

The position where the icon is fixedly displayed may be a current position where the icon flashes, or may be the first preset position. The first preset position may be a position that is set by users according to their hand-holding habits for easy touch operation, for example, a lower half of the screen, or a side of the screen that is close to a user's dominant hand. The specific position where an icon is fixedly displayed is not limited in this embodiment.

When the icon is fixedly displayed, the position where the icon is not displayed on the screen may be in a screen-off state, thereby reducing power consumption of the mobile terminal and making a display of the icon more conspicuous.

In addition, when the mobile terminal stops shaking and no touch operation is performed on the icon, step 302 may be performed again.

Further, in order to avoid a fixed display of the icon caused by the shaking of the mobile terminal when a user is walking or taking a boat, a condition that an angle of the mobile terminal after the shaking is in a preset handheld angle range can be added after it is determined that the mobile terminal is shaking. The preset handheld angle range may be an angle range in which a mobile terminal is normally viewed by the user, so that the mobile terminal can be prevented from displaying the icon fixedly when the mobile terminal is not viewed by the user, thereby reducing power consumption of the mobile terminal. Certainly, a contact sensor may be alternatively added on an outer surface of the mobile terminal, and the contact sensor is provided at a position where the mobile terminal is contacted when the user holds the mobile terminal. A condition that the contact sensor detects a contact is additionally added after it is determined that the mobile terminal is shaking, so that the icon is fixedly displayed when the mobile terminal is shaking and the contact sensor senses a contact. In this way, the mobile terminal can also be prevented from displaying the icon fixedly when the mobile terminal is not viewed by the user, thereby reducing power consumption of the mobile terminal.

In an optional implementation, the screen includes a fingerprint recognition module, and after step 303, the method may further include:

if a first touch operation acting on the icon is detected, identifying fingerprint information of the first touch operation by using the fingerprint recognition module; and if the fingerprint information matches a preset fingerprint information, unlocking the mobile terminal and displaying an application interface of the application.

The first touch operation may be a tap operation (a single-tap operation or a double-tap operation), a slide operation, or a touch operation in which any fingerprint is in contact with the screen, such as a long press operation, which is not limited in this implementation. The fingerprint recognition module is positioned below the screen and corresponds to a position where the icon is displayed. When the user performs the first touch operation on the icon, the fingerprint recognition module can identify the fingerprint information of the first touch operation. A specific recognition mode may be as follows: A finger touches the screen during the first touch operation of the user, the light emitted from the screen illuminates fingerprint texture, and the fingerprint recognition module collects an image of the illuminated fingerprint texture to identify the fingerprint information of the first touch operation.

The application interface of the application displayed after the mobile terminal is unlocked may be an unread message list interface in the application, may be a session list interface, may be a session window interface including an unread message, or the like. This embodiment does not limit a specifically displayed application interface of the application.

Further, the step of displaying an application interface of the application may include:

if the application receives an unread message, displaying a session window interface corresponding to the unread message; or if the application receives a plurality of unread messages, displaying a session window interface corresponding to a target unread message, where the target unread message is an unread message having a highest priority of message content among the plurality of unread messages.

The priority of the message content may be determined based on a keyword included in the message and preset by the user, for example, "time", "amount", "ticket", and "food"; or may be determined based on content containing user identity information in the unread message, for example, a name of a user account, and a name of a user. Alternatively, the user may preset priorities of different contents, for example, content related to money has the highest priority, followed by content related to time and content related to sports. Subsequently, when an application receives three unread messages respectively including words related to money, time, and sports, the user unlocks the mobile terminal through the first touch operation, and then the mobile terminal displays a session window interface of an application including words related to money.

A session window corresponding to the target unread message is displayed after the mobile terminal is unlocked, so that importance of unread messages received by the application can be screened out, and the user can view more important content more quickly, thereby improving efficiency of processing important content by the user.

In this implementation, by performing a first touch operation on an icon, the user can unlock the mobile terminal and an application interface of an application is displayed on the mobile terminal, thereby reducing operations such as unlocking the mobile terminal and starting the application by the user, and improving efficiency of processing an unread message by the user.

In another optional implementation, after step 303, the method may further include:

if a second touch operation acting on the icon is detected, identifying message content of an unread message of the application; and lighting a second preset position of the screen, and displaying a target unread message at the second preset position, where the target unread message is an unread message that does not include privacy information in the application.

The second touch operation may be a tap operation (a single-tap operation or a double-tap operation), a slide operation, or a touch operation, such as a long press operation, which is not limited in this implementation. After detecting the second touch operation, the mobile terminal identifies unread messages of the application, and distinguishes between an unread message that includes privacy information and an unread message that does not include privacy information.

The second preset position in the screen is lit and the previously identified unread message that does not include privacy information is displayed at the second preset position. The second preset position may not coincide with a position where the icon is displayed, so that the unread message can be viewed clearly.

In this implementation, the user can quickly view the unread message that does not include privacy information by performing the second touch operation on the icon without unlocking the mobile terminal, thereby improving efficiency of the user in reading the unread message.

In this embodiment, when it is detected that the mobile terminal is shaking, the icon is controlled to be fixedly displayed at a current display position, or the icon is displayed at the first preset position on the screen. In this way, time for the user to wait for the icon to flash can be reduced, facilitating a touch operation of the user on the icon, and improving efficiency of the user in processing the unread message.

Figure 5:
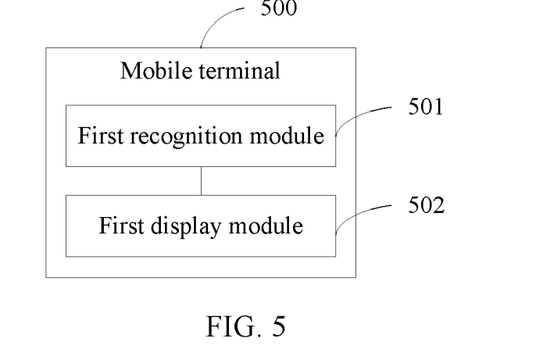
FIG. 5 is a structural diagram of a mobile terminal according to an embodiment of the present disclosure.

Referring to FIG. 5, FIG. 5 is a structural diagram of a mobile terminal according to an embodiment of the present disclosure. As shown in FIG. 5, a mobile terminal 500 includes a first recognition module 501 and a first display module 502.

The first recognition module 501 is configured to: if an unread message is received when the mobile terminal is in a screen-off state, identify an application pushing the unread message.

The first display module 502 is configured to highlight an icon of the application on a screen of the mobile terminal, where a position where the icon is not displayed on the screen is in a screen-off state.

Figure 6:
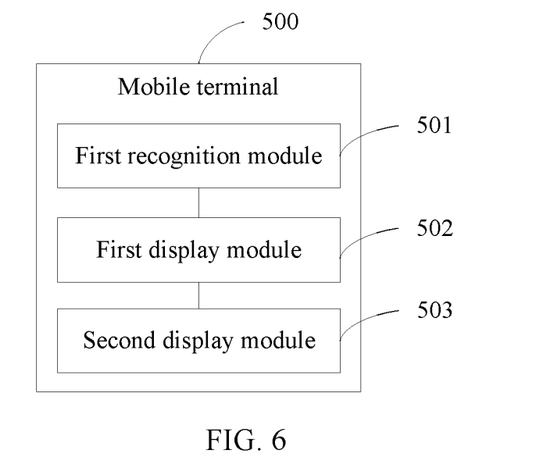
FIG. 6 is a structural diagram of another mobile terminal according to an embodiment of the present disclosure.

Optionally, as shown in FIG. 6, the first display module 502 is further configured to flash the icon of the application on the screen of the mobile terminal, where a position of the icon flashing on the screen changes with time.

The mobile terminal 500 further includes:

a second display module 503, configured to: when it is detected that the mobile terminal is shaking, control the icon to be fixedly displayed at a current display position of the screen, or display the icon at a first preset position of the screen.

Figure 7:
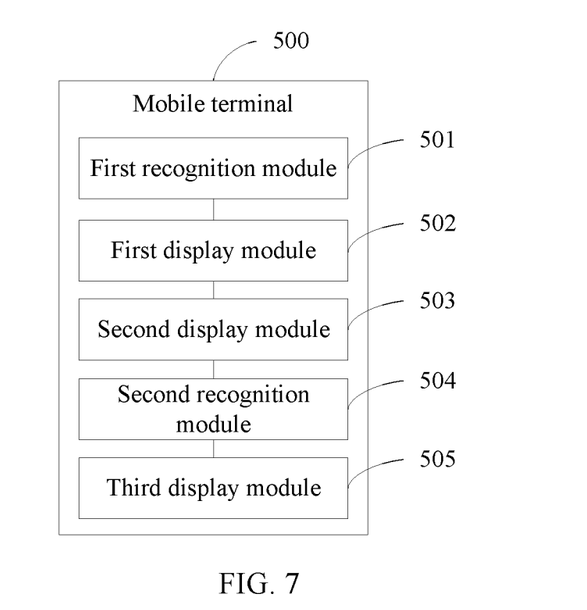
FIG. 7 is a structural diagram of another mobile terminal according to an embodiment of the present disclosure.

Optionally, as shown in FIG. 7, the screen includes a fingerprint recognition module, and the mobile terminal 500 further includes:

a second recognition module 504, configured to: if a first touch operation acting on the icon is detected, identify fingerprint information of the first touch operation by using the fingerprint recognition module; and a third display module 505, configured to: if the fingerprint information matches preset fingerprint information, unlock the mobile terminal and display an application interface of the application.

Figure 8:
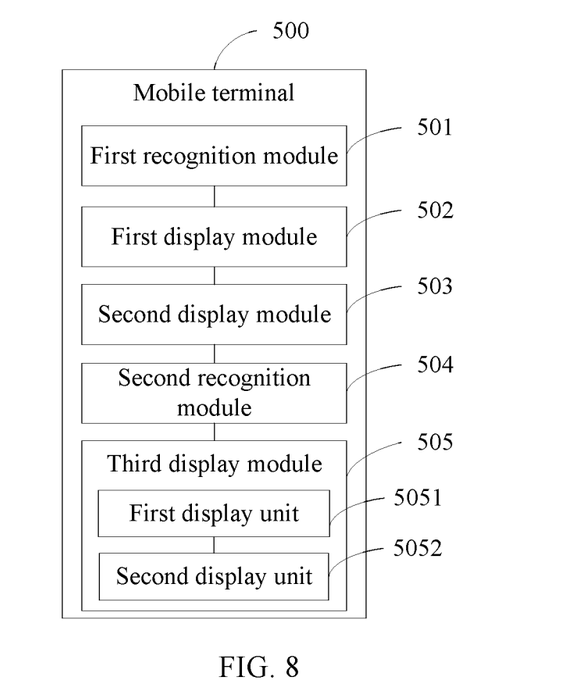
FIG. 8 is a structural diagram of another mobile terminal according to an embodiment of the present disclosure.

Optionally, as shown in FIG. 8, the third display module 505 includes:

a first display unit 5051, configured to: if the application receives an unread message, display a session window interface corresponding to the unread message; or a second display unit 5052, configured to: if the application receives a plurality of unread messages, display a session window interface corresponding to a target unread message, where the target unread message is an unread message having a highest priority of message content among the plurality of unread messages.

Figure 9:
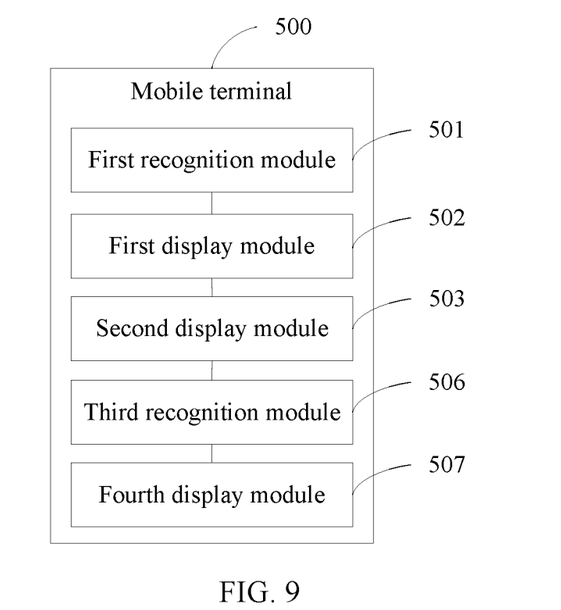
FIG. 9 is a structural diagram of another mobile terminal according to an embodiment of the present disclosure.

Optionally, as shown in FIG. 9, the mobile terminal 500 further includes:

a third recognition module 506, configured to: if a second touch operation acting on the icon is detected, identify message content of an unread message of the application; and a fourth display module 507, configured to light a second preset position of the screen, and display a target unread message at the second preset position, where the target unread message is an unread message that does not include privacy information in the application.

Figure 10:
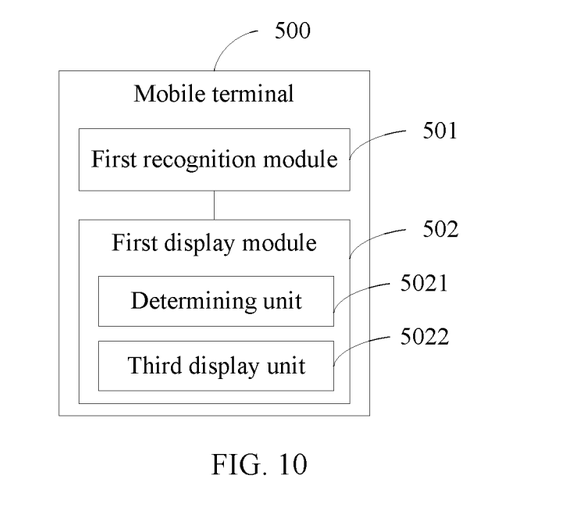
FIG. 10 is a structural diagram of another mobile terminal according to an embodiment of the present disclosure.

Optionally, as shown in FIG. 10, the first display module 502 includes:

a determining unit 5021, configured to determine a quantity of unread messages received by the application; and a third display unit 5022, configured to highlight the icon of the application on the screen of the mobile terminal, where a display area of the icon is directly proportional to the quantity of the unread messages, or a flashing frequency of the icon is directly proportional to the quantity of the unread messages.

The mobile terminal 500 in this embodiment of the present invention can implement the processes implemented by the mobile terminal in the method embodiments of FIG. 1 to FIG. 4. To avoid repetition, details are not described herein again.

After receiving an unread message in a screen-off state, the mobile terminal 500 in this embodiment of the present disclosure highlights the icon of the application on the screen to prompt a user to process the unread message in time, so as to improve a prompt effect of the mobile terminal 500 on the unread message.

Figure 11:
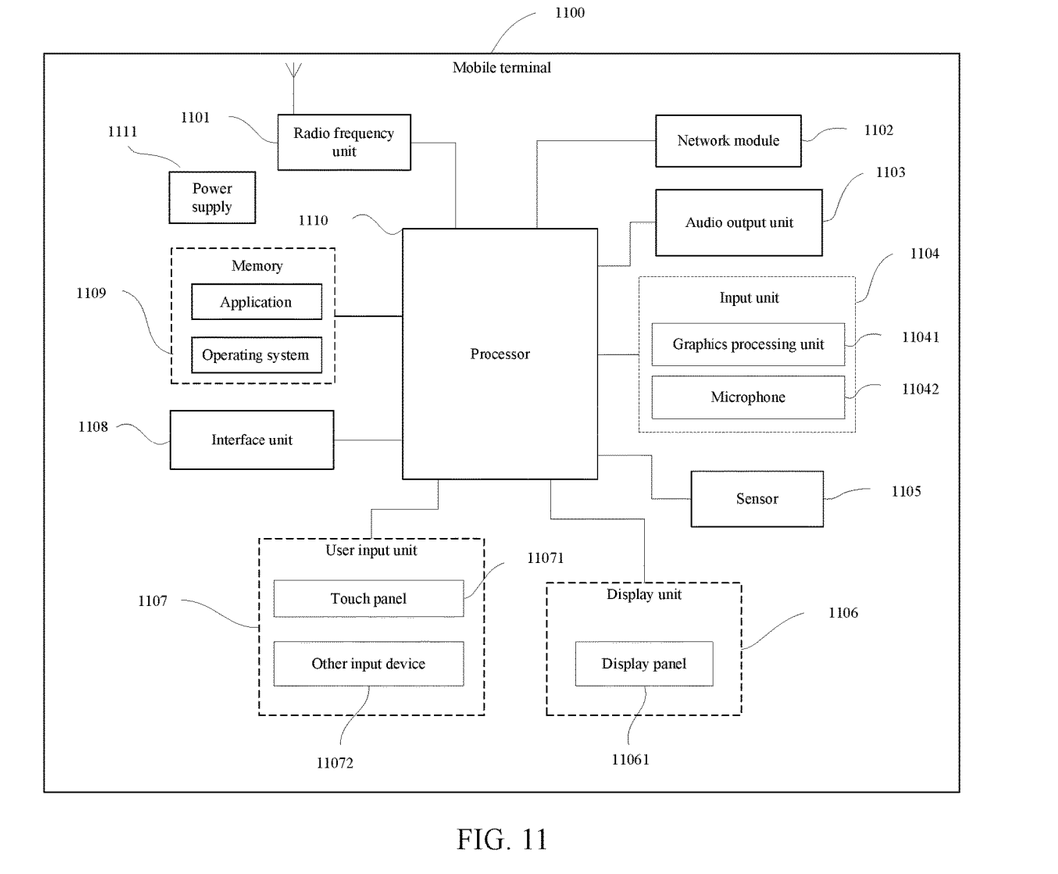
FIG. 11 is a structural diagram of another mobile terminal according to an embodiment of the present disclosure.

FIG. 11 is a schematic diagram of a hardware structure of a mobile terminal according to an embodiment of this disclosure.

The mobile terminal 1100 includes, but is not limited to: a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. A person skilled in the art may understand that the structure of the mobile terminal shown in FIG. 11 constitutes no limitation on the mobile terminal, and the mobile terminal may include more or fewer parts than those shown in the figure, or combine some parts, or have a different part arrangement. In this embodiment of the present disclosure, the mobile terminal includes, but is not limited to, a mobile phone, a tablet computer, a laptop computer, a palmtop computer, an in-vehicle terminal, a wearable device, a pedometer, and the like.

The processor 1110 is configured to: if an unread message is received when the mobile terminal is in a screen-off state, identify an application pushing the unread message; and highlight an icon of the application on a screen of the mobile terminal, where a position where the icon is not displayed on the screen is in a screen-off state.

Optionally, the step of highlighting an icon of the application on a screen of the mobile terminal performed by the processor 1110 includes: flashing the icon of the application on the screen of the mobile terminal, where a position of the icon flashing on the screen changes with time. The processor 1110 is further configured to: when it is detected that the mobile terminal is shaking, control the icon to be fixedly displayed at a current display position of the screen, or display the icon at a first preset position of the screen.

Optionally, the screen includes a fingerprint recognition module, and the processor 1110 is further configured to: if a first touch operation acting on the icon is detected, identify fingerprint information of the first touch operation by using the fingerprint recognition module; and if the fingerprint information matches preset fingerprint information, unlock the mobile terminal and display an application interface of the application.

Optionally, the step of displaying an application interface of the application performed by the processor 1110 includes: if the application receives an unread message, displaying a session window interface corresponding to the unread message; or, if the application receives a plurality of unread messages, display a session window interface corresponding to a target unread message, where the target unread message is an unread message having a highest priority of message content among the plurality of unread messages.

Optionally, the processor 1110 is further configured to: if a second touch operation acting on the icon is detected, identify message content of an unread message of the application; and light a second preset position of the screen, and display a target unread message at the second preset position, where the target unread message is an unread message that does not include privacy information in the application.

Optionally, the step of flashing an icon of the application on a screen of the mobile terminal performed by the processor 1110 includes: determining a quantity of unread messages received by the application; and flashing the icon of the application on the screen of the mobile terminal, where a display area of the icon is directly proportional to the quantity of the unread messages.

The mobile terminal 1100 can implement each process implemented by the mobile terminal in the foregoing embodiments. To avoid repetition, details are not described herein again.

After receiving an unread message in a screen-off state, the mobile terminal 1100 in this embodiment of the present disclosure highlights the icon of the application on the screen to prompt a user to process the unread message in time, so as to improve a prompt effect of the mobile terminal 1100 on the unread message.

It should be understood that in this embodiment of this disclosure, the radio frequency unit 1101 may be configured to receive and send information, or to receive and send a signal in a call process, and specifically, after receiving downlink data from a base station, send the downlink data to the processor 1110 for processing; and also send uplink data to the base station. Generally, the radio frequency unit 1101 includes but is not limited to: an antenna, at least one amplifier, a transceiver, a coupler, a low noise amplifier, a duplexer, and the like. In addition, the radio frequency unit 1101 may further communicate with another device by using a wireless communications system and network.

The mobile terminal provides wireless broadband Internet access for a user by using the network module 1102, for example, helping the user send and receive an email, browse a web page, and access streaming media.

The audio output unit 1103 may convert audio data received by the radio frequency unit 1101 or the network module 1102 or stored in the memory 1109 into an audio signal and output the audio signal as a sound. In addition, the audio output unit 1103 may further provide an audio output (for example, a call signal received voice, or a message received voice) related to a specific function implemented by the mobile terminal 1100. The audio output unit 1103 includes a speaker, a buzzer, a telephone receiver, and the like.

The input unit 1104 is configured to receive an audio or video signal. The input unit 1104 may include a graphics processing unit (GPU) 11041 and a microphone 11042. The graphics processing unit 11041 processes image data of a static picture or a video obtained by an image capturing apparatus (for example, a camera) in a video capturing mode or an image capturing mode. A processed image frame may be displayed on the display unit 1106. The image frame processed by the graphics processing unit 11041 may be stored in the memory 1109 (or another storage medium) or sent via the radio frequency unit 1101 or the network module 1102. The microphone 11042 can receive a sound and can process the sound into audio data. The processed audio data may be converted, in a call mode, into a format that can be sent by the radio frequency unit 1101 to a mobile communication base station for output.

The mobile terminal 1100 may further include at least one sensor 1105 such as an optical sensor, a motion sensor, or another sensor. Specifically, the optical sensor includes an ambient light sensor and a proximity sensor. The ambient light sensor may adjust luminance of the display panel 11061 according to brightness of ambient light. The proximity sensor may turn off the display panel 11061 and/or backlight when the mobile terminal 1100 is moved to an ear. As a type of the motion sensor, an accelerometer sensor may detect magnitude of an acceleration in each direction (generally three axes), and may detect magnitude and a direction of gravity when being static. The accelerometer sensor may be used for recognizing a mobile terminal gesture (for example, horizontal and vertical screen switching, a related game, or magnetometer posture calibration), a function related to vibration recognition (for example, a pedometer or a strike), or the like. The sensor 1105 may further include a fingerprint sensor, a pressure sensor, an iris sensor, a molecular sensor, a gyroscope, a barometer, a hygrometer, a thermometer, an infrared sensor, and the like. This is not described herein.

The display unit 1106 is configured to display information entered by a user or information provided for a user. The display unit 1106 may include the display panel 11061, and the display panel 11061 may be configured in a form of a liquid crystal display (LCD), an organic light-emitting diode (OLED), or the like.

The user input unit 1107 may be configured to receive inputted digit or character information and generate key signal input related to user setting and function control of the mobile terminal. Specifically, the user input unit 1107 includes a touch panel 11071 and another input device 11072. The touch panel 11071, also known as a touch screen, can collect a touch operation performed by a user on or near the touch panel (for example, an operation performed by the user on the touch panel 11071 or near the touch panel 11071 with any suitable object or accessory such as a finger or a stylus). The touch panel 11071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1110, and receives and executes a command sent by the processor 1110. In addition, the touch panel 11071 may be implemented in a plurality of forms, for example, as a resistive, capacitive, infrared, or surface acoustic wave touch panel. In addition to the touch panel 11071, the user input unit 1107 may also include another input device 11072. Specifically, the another input device 11072 may include, but is not limited to, a physical keyboard, a functional button (such as a volume control button or a power on/off button), a trackball, a mouse, and a joystick. Details are not described herein again.

Further, the touch panel 11071 may cover the display panel 11061. When detecting a touch operation on or near the touch panel 11071, the touch panel 11071 transmits the touch operation to the processor 1110 to determine a type of a touch event. Then, the processor 1110 provides corresponding visual output on the display panel 11061 based on the type of the touch event. In FIG. 11, although the touch panel 11071 and the display panel 11061 are used as two independent parts to implement input and output functions of the mobile terminal, in some embodiments, the touch panel 11071 and the display panel 11061 may be integrated to implement the input and output functions of the mobile terminal. Details are not described herein.

The interface unit 1108 is an interface connecting an external apparatus to the mobile terminal 1100. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 1108 may be configured to receive input (for example, data information and power) from an external apparatus and transmit the received input to one or more elements in the mobile terminal 1100 or may be configured to transmit data between the mobile terminal 1100 and an external apparatus.

The memory 1109 may be configured to store a software program and various data. The memory 1109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1109 may include a high-speed random access memory, and may further include a non-volatile memory, for example, at least one magnetic disk storage device, a flash memory device, or another volatile solid-state storage device.

The processor 1110 is a control center of the mobile terminal, and is connected to all parts of the entire mobile terminal by using various interfaces and lines, and performs various functions of the mobile terminal and processes data by running or executing the software program and/or the module that are stored in the memory 1109 and invoking the data stored in the memory 1109, to implement overall monitoring on the mobile terminal. The processor 1110 may include one or more processing units. Optionally, the processor 1110 may integrate an application processor and a modem processor. The application processor mainly processes an operating system, a user interface, an application, and the like. The modem processor mainly processes wireless communication. It may be understood that the foregoing modem processor may not be integrated into the processor 1110.

The mobile terminal 1100 may further include a power supply 1111 (such as a battery) that supplies power to each component. Optionally, the power supply 1111 may be logically connected to the processor 1110 by using a power supply management system, to implement functions such as charging, discharging, and power consumption management by using the power supply management system.

In addition, the mobile terminal 1100 includes some function modules not shown, and details are not described herein.

Optionally, an embodiment of the present disclosure further provides a mobile terminal, including a processor 1110, a memory 1109, and a computer program that is stored in the memory 1109 and that can run on the processor 1110. When executing the computer program, the processor 1110 implements the foregoing processes of the unread message prompt method embodiment and a same technical effect can be achieved. To avoid repetition, details are not described herein again.

The embodiments of the present disclosure further provide a computer-readable storage medium. The computer-readable storage medium stores a computer program, and when a processor executes the computer program, the processes of the foregoing unread message prompt method embodiment are implemented and the same technical effect can be achieved. To avoid repetition, details are not described herein again. The computer-readable storage medium may be a read-only memory (ROM), a random access memory (RAM), a magnetic disk, a compact disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. An element limited by "includes a . . . " does not, without more constraints, preclude the presence of additional identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network-side device, or the like) to perform the method described in the plurality of embodiments of this disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An unread message prompt method applied to a mobile terminal, the method comprising:
    receiving an unread message when the mobile terminal is in a screen-off state;
    in response to receiving the unread message, identifying an application pushing the unread message;
    highlighting an icon of the application on a screen of the mobile terminal, wherein a position where the icon is not displayed on the screen is in a screen-off state, and wherein highlighting the icon of the application on the screen of the mobile terminal comprises:
        flashing the icon of the application on the screen of the mobile terminal, wherein a position of the icon flashing on the screen changes with time;
    after highlighting the icon of the application on the screen of the mobile terminal, detecting that the mobile terminal is shaking; and
    in response to detecting that the mobile terminal is shaking, controlling the icon to be fixedly displayed at a current display position of the screen, or displaying the icon at a first preset position of the screen.

2. The method according to claim 1, wherein the screen comprises a fingerprint recognition module, and after controlling the icon to be fixedly displayed at the current display position of the screen, or displaying the icon at the first preset position of the screen, the method further comprises:
    detecting a first touch operation acting on the icon;
    in response to detecting the first touch operation acting on the icon, identifying fingerprint information of the first touch operation by using the fingerprint recognition module; and
    in response to the fingerprint information matching preset fingerprint information, unlocking the mobile terminal and displaying an application interface of the application.

3. The method according to claim 2, wherein displaying the application interface of the application comprises:
    displaying a session window interface corresponding to the unread message in response to the application receiving the unread message; or
    displaying a session window interface corresponding to a target unread message in response to the application receiving a plurality of unread message, wherein the target unread message is an unread message having a highest priority of message content among the plurality of unread messages.

4. The method according to claim 1, wherein, after controlling the icon to be fixedly displayed at the current display position of the screen, or displaying the icon at the first preset position of the screen, the method further comprises:
    detecting a second touch operation acting on the icon;
    in response to detecting the second touch operation acting on the icon, identifying message content of the unread message of the application; and
    lighting a second preset position of the screen, and displaying a target unread message at the second preset position, wherein the target unread message is an unread message that does not comprise privacy information in the application.

5. The method according to claim 1, wherein highlighting the icon of the application on the screen of the mobile terminal further comprises:
    determining a quantity of unread messages received by the application; and highlighting the icon of the application on the screen of the mobile terminal, wherein a display area of the icon is directly proportional to the quantity of the unread messages.

6. A mobile terminal, comprising a processor, a memory, and a computer program stored in the memory and executable by the processor, wherein the computer program, when executed by the processor, causes the processor to implement an unread message prompt method, the method comprising:
receiving an unread message when the mobile terminal is in a screen-off state;
in response to receiving the unread message, identifying an application pushing the unread message;
highlighting an icon of the application on a screen of the mobile terminal, wherein a position where the icon is not displayed on the screen is in a screen-off state, and wherein highlighting the icon of the application on the screen of the mobile terminal comprises:
flashing the icon of the application on the screen of the mobile terminal, wherein a position of the icon flashing on the screen changes with time;
after highlighting the icon of the application on the screen of the mobile terminal, detecting that the mobile terminal is shaking; and
in response to detecting that the mobile terminal is shaking, controlling the icon to be fixedly displayed at a current display position of the screen, or displaying the icon at a first preset position of the screen.

7. The mobile terminal according to claim 6, wherein the screen comprises a fingerprint recognition module, and after controlling the icon to be fixedly displayed at the current display position of the screen, or displaying the icon at the first preset position of the screen, the method further comprises:
detecting a first touch operation acting on the icon;
in response to detecting the first touch operation acting on the icon, identifying fingerprint information of the first touch operation by using the fingerprint recognition module; and
in response to the fingerprint information matching preset fingerprint information, unlocking the mobile terminal and displaying an application interface of the application.

8. The mobile terminal according to claim 7, wherein displaying the application interface of the application comprises:
displaying a session window interface corresponding to the unread message in response to the application receiving the unread message; or
displaying a session window interface corresponding to a target unread message in response to the application receiving a plurality of unread message, wherein the target unread message is an unread message having a highest priority of message content among the plurality of unread messages.

9. The mobile terminal according to claim 6, wherein, after controlling the icon to be fixedly displayed at the current display position of the screen, or displaying the icon at the first preset position of the screen, the method further comprises:
detecting a second touch operation acting on the icon;
in response to detecting the second touch operation acting on the icon, identifying message content of the unread message of the application; and
lighting a second preset position of the screen, and displaying a target unread message at the second preset position, wherein the target unread message is an unread message that does not comprise privacy information in the application.

10. The mobile terminal according to claim 6, wherein highlighting the icon of the application on the screen of the mobile terminal further comprises:
determining a quantity of unread messages received by the application; and
highlighting the icon of the application on the screen of the mobile terminal, wherein a display area of the icon is directly proportional to the quantity of the unread messages.

11. A non-transitory computer-readable storage medium, storing a computer program that, when executed by a processor, causes the processor to implement an unread message prompt method, the method being applied to a mobile terminal and comprising:
receiving an unread message when the mobile terminal is in a screen-off state;
in response to receiving the unread message, identifying an application pushing the unread message;
highlighting an icon of the application on a screen of the mobile terminal, wherein a position where the icon is not displayed on the screen is in a screen-off state, and wherein highlighting the icon of the application on the screen of the mobile terminal comprises:
flashing the icon of the application on the screen of the mobile terminal, wherein a position of the icon flashing on the screen changes with time;
after highlighting the icon of the application on the screen of the mobile terminal, detecting that the mobile terminal is shaking; and
in response to detecting that the mobile terminal is shaking, controlling the icon to be fixedly displayed at a current display position of the screen, or displaying the icon at a first preset position of the screen.

12. The non-transitory computer-readable storage medium according to claim 11, wherein the screen comprises a fingerprint recognition module, and after controlling the icon to be fixedly displayed at the current display position of the screen, or displaying the icon at the first preset position of the screen, the method further comprises:
detecting a first touch operation acting on the icon;
in response to detecting the first touch operation acting on the icon, identifying fingerprint information of the first touch operation by using the fingerprint recognition module; and
in response to the fingerprint information matching preset fingerprint information, unlocking the mobile terminal and displaying an application interface of the application.

13. The non-transitory computer-readable storage medium according to claim 12, wherein displaying the application interface of the application comprises:
displaying a session window interface corresponding to the unread message in response to the application receiving the unread message; or
displaying a session window interface corresponding to a target unread message in response to the application receiving a plurality of unread message, wherein the target unread message is an unread message having a highest priority of message content among the plurality of unread messages.

14. The non-transitory computer-readable storage medium according to claim 11, wherein, after controlling the icon to be fixedly displayed at the current display position of the screen, or displaying the icon at the first preset position of the screen, the method further comprises:
- detecting a second touch operation acting on the icon;
- in response to detecting the second touch operation acting on the icon, identifying message content of the unread message of the application; and
- lighting a second preset position of the screen, and displaying a target unread message at the second preset position, wherein the target unread message is an unread message that does not comprise privacy information in the application.

15. The non-transitory computer-readable storage medium according to claim 11, wherein highlighting the icon of the application on the screen of the mobile terminal further comprises:
- determining a quantity of unread messages received by the application; and
- highlighting the icon of the application on the screen of the mobile terminal, wherein a display area of the icon is directly proportional to the quantity of the unread messages.

\* \* \* \* \*